F. SHAFFER.
MACHINE FOR CLEANING CLAMS AND OTHER FISH.
APPLICATION FILED MAR. 2, 1910.
1,011,378.
Patented Dec. 12, 1911.
3 SHEETS—SHEET 2.
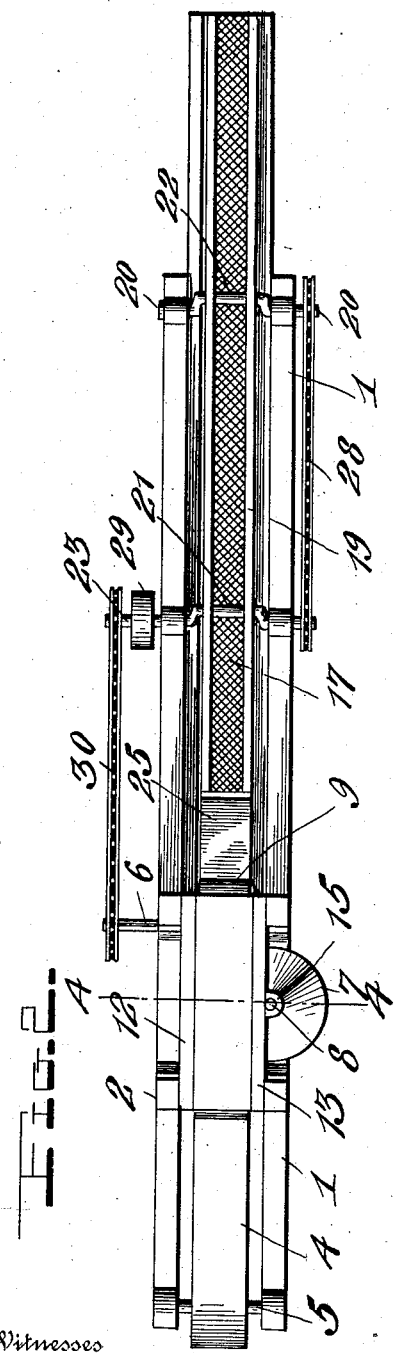
Witnesses
Chas. L. Griesbauer.
E. M. Ricketts
Inventor
F. Shaffer,
By Watson E. Coleman.
Attorney

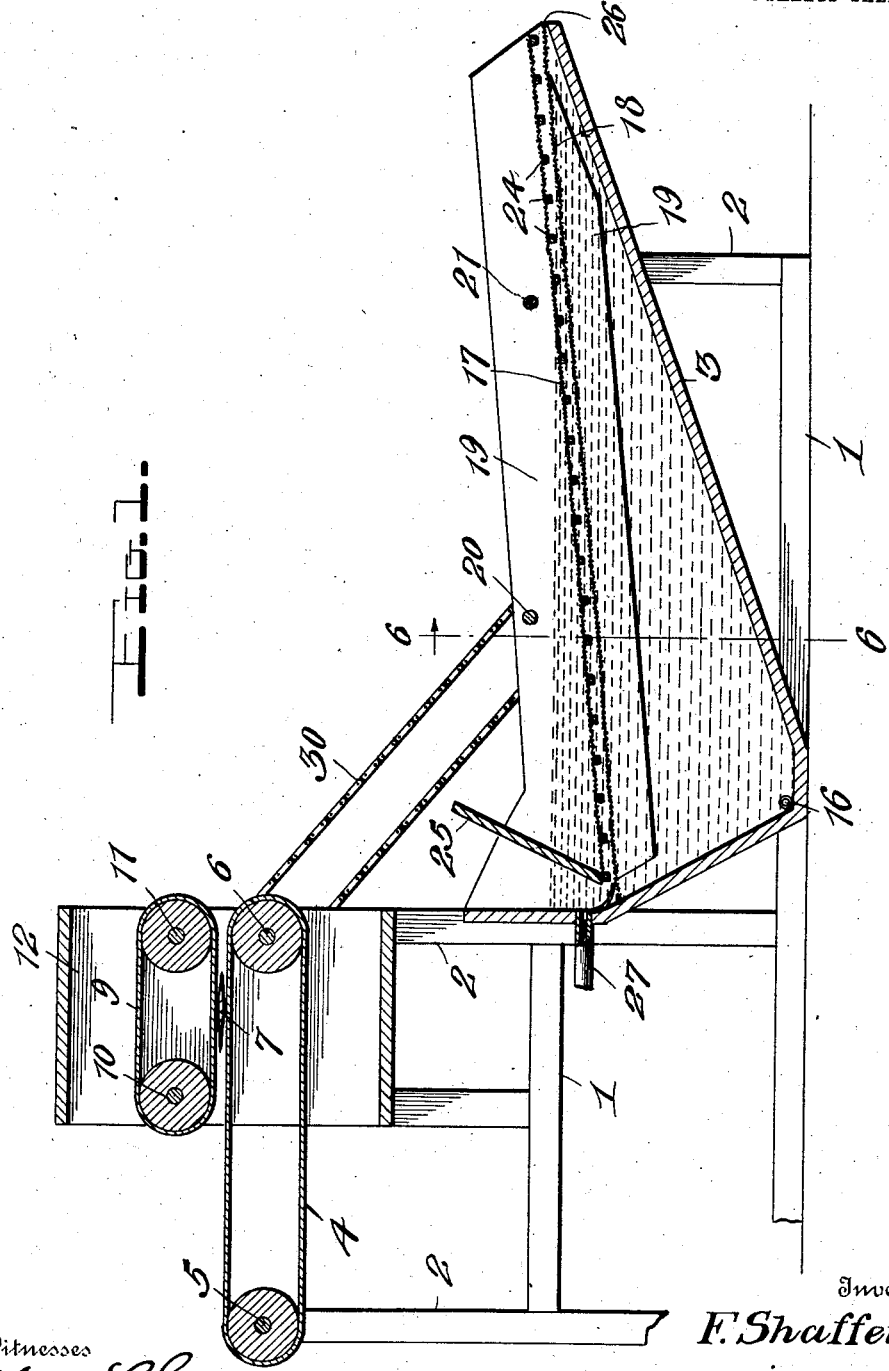

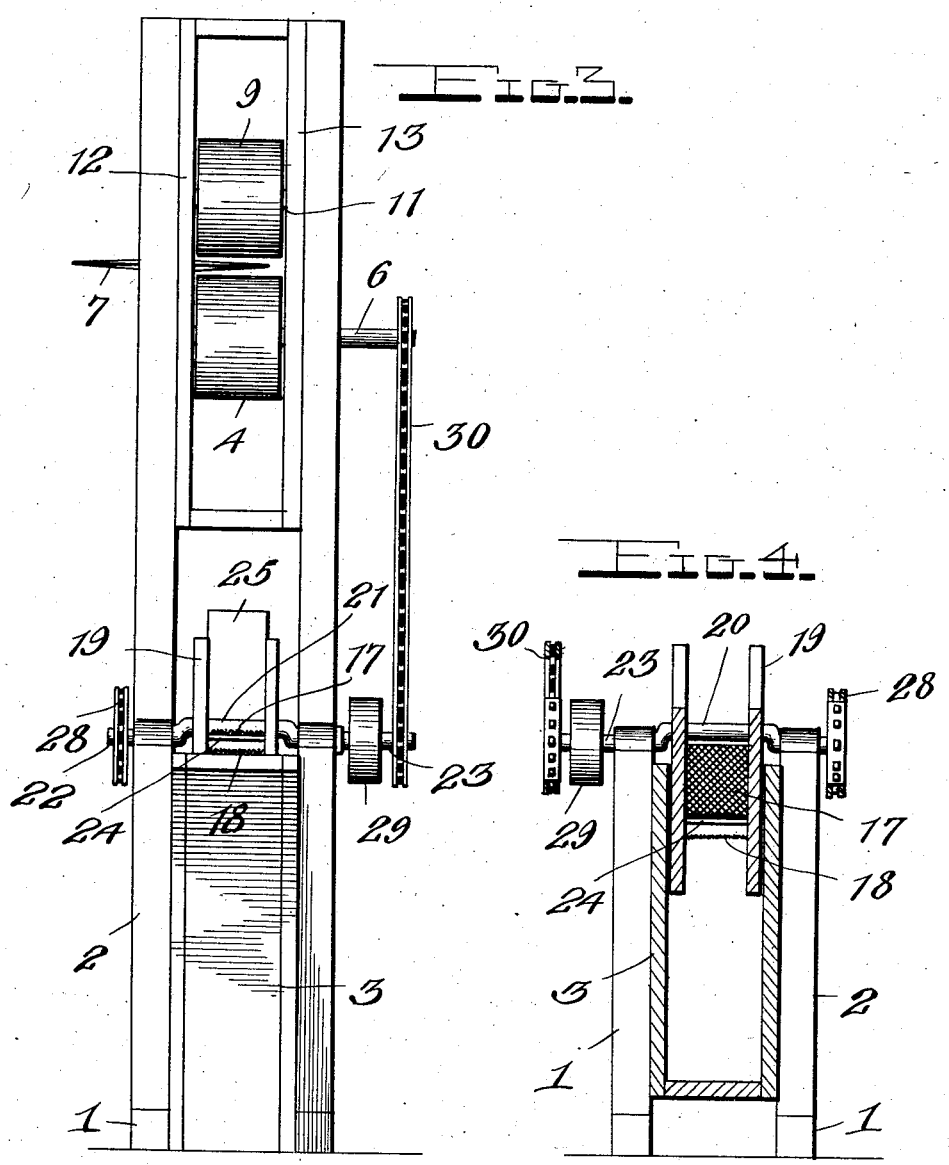

UNITED STATES PATENT OFFICE.

FRANK SHAFFER, OF MOCLIPS, WASHINGTON.

MACHINE FOR CLEANING CLAMS AND OTHER FISH.

1,011,378. Specification of Letters Patent. Patented Dec. 12, 1911.

Application filed March 2, 1910. Serial No. 546,879.

*To all whom it may concern:*

Be it known that I, FRANK SHAFFER, a citizen of the United States, residing at Moclips, in the county of Chehalis and State of Washington, have invented certain new and useful Improvements in Machines for Cleaning Clams and other Fish, of which the following is a specification, reference being had to the accompanying drawings.

My invention relates to improvements in machines for washing clams and other fish, and especially adapted for use in connection with a machine for opening or cutting the clams or other fish, and so as to prepare the opened or cut clams or other fish for eating, cooking or canning.

With the above and other objects in view, the invention consists of the novel construction, combination and arrangement of parts, hereinafter fully described and claimed, and illustrated in the accompanying drawings in which:—

Figure 1 is a vertical, longitudinal section through a machine embodying my invention; Fig. 2 is a top plan view; Fig. 3 is an end view; Fig. 4 is a section taken on the plane indicated by the line 6—6 in Fig. 1.

For the purposes of this specification my improved clam or other fish washing mechanism is shown and described in connection with an opening or cutting mechanism, both the washing mechanism and the cutting mechanism being arranged in the same frame work, so as to make a single machine and the said washing mechanism and cutting mechanism being connected together and simultaneously operated. The clam cutting and opening mechanism is covered by a divisional application for Letters Patent of the United States, Serial No. 599,098, filed by me December 24, 1910, the claims forming a part of this application relating solely to the washing mechanism which constitutes the present invention.

My improved machine comprises a suitable framework having preferably a horizontal portion 1 and an upright portion 2. In the horizontal part of the frame is arranged a washing receptacle or tank 3 which receives the clams, fish or the like, after they have been opened by a feeding and cutting mechanism arranged on the upright portion of the frame. The severed or cut clams drop from the belt or conveyer 4 into one end of the tank 3, which latter is preferably provided with parallel, upright sides and downwardly and inwardly converging end and bottom portions so that the offal and sediment collecting on the bottom of the tank may be removed through a suitable outlet valve or gate 16. The tank is provided with an inclined fixed screen 18 which extends from end to end thereof, its lower end being submerged and its upper end being disposed at the outlet 26 of the tank. A movable frame 19 is hung in the tank, above the screen 18. This movable frame is provided with an inclined screen 17 which is secured thereto and moves therewith, the said frame being also provided with a series of transverse cleats or bars 24 below the screen 17, these bars constituting flights. An inclined deflector board or plate 25 is arranged at the lower end of the frame 19 and forms, in connection with the adjacent end of the tank 3, a pocket or hopper to receive the clams from the belt or conveyer 4 and direct them into the space between the screens 17 and 18. Shafts 22 and 23 are disposed transversely on the tank and mounted in suitable bearings on the sides thereof, and are respectively provided with intermediate crank portions 20 and 21. These crank portions extend through and have their bearings in the sides of the movable frame. Hence, when the crank shafts rotate, the frame 19 with its screen 17 has oscillating motion imparted thereto and moves both longitudinally and vertically so that the screen 17 moves longitudinally above the screen 18 toward the discharge end 26 of the tank, then rises, then, while elevated, moves longitudinally in the reverse direction, and is then lowered toward the screen 18, etc., the result being that the clams are moved by the action of the movable screen and the flight bars 28, longitudinally over the screen 18, intermittently and to the discharge end of the tank. The agitation of the clams in the water as they work between the screens from end to end of the tank causes them to be effectively washed so that when they pass out of the outlet end 26 of the tank they are free from offal and undesirable parts, such offal and sediment passing through the lower screen and settling on the bottom of the tank. It will be understood that the level of the water is maintained in the tank above the screens, and this water may be changed as often as is necessary, or if desired, a continuous stream of water may be forced through the tank and screens by providing a water supply pipe 27 at the inlet or receiving end of the tank. The cut clams which are moved by the action of the movable screen and the flight bars 28 longitudinally over the screen 18 to the discharge end of the tank are submerged while being thus acted upon and hence are carried through the water in the tank and thereby cleansed.

The two crank shafts 22, 23, are rotated in unison by means of connecting sprocket chain gearing 28, and on the shaft 23 I preferably provide a power belt wheel or pulley 29. I also preferably provide sprocket chain gearing 30 between the shaft 23 and the shaft 6 of the feeding belt or conveyer 4 so that all parts of the machine will be driven from the shaft 23.

From the foregoing it will be seen that my improved machine is simple in construction and may therefore be produced at a small cost and will be strong and durable. I have found that in operation it will effectively open and clean razor, mud and butter clams, and other species of shell fish. Its use obviates the necessity of cutting and cleaning the clams by hand, and prepares the clams for either canning or table use.

Having thus described the invention, what is claimed is:

1. A washing machine of the class described comprising a tank for the reception of water, shafts mounted transversely on the tank and having cranks, means to rotate said shafts, an inclined fixed lower screen extending longitudinally in and disposed with one end at the discharge portion of the tank, and an inclined frame extending longitudinally in the tank and hung on the cranks of the shafts for operation thereby, the said frame having a screen therein disposed above and spaced from the fixed lower screen and being further provided at its lower end with a deflector board extending downwardly and inclined toward and spaced from one end of the tank.

2. A washing machine of the class described comprising a tank for the reception of water, shafts mounted transversely on the tank and having cranks, means to rotate said shafts, an inclined fixed lower screen extending longitudinally in and disposed with one end at the discharge portion of the tank, and an inclined frame extending longitudinally in the tank and hung on the cranks of the shafts for operation thereby, the said frame having a screen disposed above and spaced from the fixed lower screen and being further provided at its lower end with a deflecter board extending downwardly and inclined toward and spaced from one end of the tank, the said frame being further provided with transverse spaced cleats on the under side of the upper screen.

In testimony whereof I hereunto affix my signature in the presence of two witnesses.

FRANK SHAFFER.

Witnesses:
JAMES P. H. CALLAHAN,
P. A. SNIDER.

Copies of this patent may be obtained for five cents each, by addressing the "Commissioner of Patents, Washington, D. C."